US009662988B2

(12) United States Patent
Enomoto

(10) Patent No.: US 9,662,988 B2
(45) Date of Patent: May 30, 2017

(54) SYSTEM AND METHOD FOR POWER MANAGEMENT OF OFF-BOARD LOADS BEING POWERED AND/OR CHARGED BY AN ELECTRIC VEHICLE

(71) Applicant: Honda Motor Co., Ltd., Minato-ku, Tokyo (JP)

(72) Inventor: Tomoyuki Enomoto, Torrance, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 240 days.

(21) Appl. No.: 14/564,918

(22) Filed: Dec. 9, 2014

(65) Prior Publication Data

US 2016/0159229 A1    Jun. 9, 2016

(51) Int. Cl.
*H02J 7/00*    (2006.01)
*B60L 11/18*   (2006.01)

(52) U.S. Cl.
CPC ....... *B60L 11/1816* (2013.01); *Y02T 10/7005* (2013.01); *Y02T 10/7044* (2013.01); *Y02T 90/14* (2013.01)

(58) Field of Classification Search
CPC .......... H02J 7/0054; H02J 1/14; H02J 7/0031; H02J 7/1438; H02J 7/1461; H02J 2007/0049; H02J 2007/005; H02J 2007/0095; B60L 11/1861; B60L 11/1868; B60L 3/04; B60L 11/1851; B60L 11/1816; Y02T 90/14; Y02T 10/7005; Y02T 10/7044
See application file for complete search history.

(56) References Cited

U.S. PATENT DOCUMENTS

| 5,586,448 | A | 12/1996 | Ikeda et al. |
|---|---|---|---|
| 6,208,931 | B1 | 3/2001 | Schoettle et al. |
| 7,711,460 | B2 | 5/2010 | Yakes et al. |
| 8,190,318 | B2 | 5/2012 | Li et al. |
| 2010/0270968 | A1* | 10/2010 | Reese ................. B60L 11/1851 320/103 |
| 2011/0118924 | A1 | 5/2011 | Nasu et al. |
| 2013/0043738 | A1 | 2/2013 | Park et al. |
| 2013/0244828 | A1 | 9/2013 | Kayano et al. |
| 2013/0324357 | A1 | 12/2013 | Stenson |
| 2014/0002024 | A1 | 1/2014 | Ang et al. |
| 2014/0080024 | A1 | 3/2014 | Igarashi et al. |
| 2014/0358352 | A1* | 12/2014 | Yamamoto ............ B60L 3/0046 701/22 |

OTHER PUBLICATIONS

Electric Vehicle Management Syotem (EVMS), as viewed on Sep. 12, 2014, http://www.electromotus.lt/en/products/electric-vehicle-management-system-evms.

* cited by examiner

*Primary Examiner* — Nha Nguyen
(74) *Attorney, Agent, or Firm* — Arent Fox LLP

(57) ABSTRACT

A method to adjust power management of off-board devices being powered by a vehicle is provided. The method includes entering a plurality of user selected charging levels for each of the off-board devices, each user selected charging level corresponding to one of a plurality of threshold levels of a state of charge (SOC) level; determining a current SOC of a battery pack of the vehicle; adjusting charging levels of individual off-board devices from first user selected charging levels to second user selected charging levels when the current SOC of the battery pack changes from a first threshold value to a second threshold value.

20 Claims, 3 Drawing Sheets

SYSTEM AND METHOD FOR POWER MANAGEMENT OF OFF-BOARD LOADS BEING POWERED AND/OR CHARGED BY AN ELECTRIC VEHICLE

FIELD

The present application generally relates to an electric vehicle (EV), and, more particularly, to an EV having a system and method to allow a user to set a charge level and/or power level for off-board devices coupled to the EV.

BACKGROUND

Electric vehicles (EVs) are vehicles that may be propelled by one or more electric motors that may be powered by rechargeable battery packs. EVs may include plug-in electric vehicles (PEVs), hybrid electric vehicles (HEVs) such as plug-in hybrid electric vehicles (PHEVs), as well as other types of vehicles which may be powered either in whole or in part by an electric motor.

A plug-in electric vehicle (PEV) is a motor vehicle that may be recharged from an external source of electricity, such as a wall socket or a charging station. The electricity stored in the rechargeable battery packs may be used to drive the wheels of the PEV.

An HEV is a vehicle which may have an electric motor and an internal combustion engine (ICE). A PHEV is a type of hybrid vehicle which may use rechargeable batteries, or other energy storage devices (hereinafter rechargeable batteries) to power the electric motor, that may be restored to full charge by connecting the rechargeable batteries via a plug to an external electric power source such as an electric wall socket or a charging station. The rechargeable batteries may also be recharged through operation of the ICE.

EVs may have on-board and off-board power consuming systems and/or devices (hereinafter on-board systems and off-board systems), in addition to the EV drive systems. On-board systems may include vehicle safety systems and sensors, vehicle lighting, heating ventilation and cooling (HVAC) systems of the vehicle, vehicle telematic systems, vehicle radio and entertainment devices, as well as other on-board systems. An off-board system may be defined as a power consuming system that may be coupled to the PHEV as an aftermarket accessory, or a system that may draw power from the vehicle through a vehicle 12 volt outlet, USB port, or via a direct connection to the vehicle power supply terminals. The power demand of the aforementioned vehicle on-board systems and off-board systems may limit the operating range of the EV, and cause undue strain on the vehicle's power supply and energy storage devices.

EVs may have a power management system (PMS) to distribute vehicle power demand between the different on-board power usage systems. While the PMS of the EV may control the distribution of vehicle power between the different on-board systems, power management of off-board systems is presently not supported. Since power management of off-board systems is presently not supported, users may not be able to set a charge level and/or power level for off-board devices coupled to the EV in order to preserve the vehicle's power supply and energy storage devices.

Therefore, it would be desirable to provide a system and method that overcome the above identified concerns, as well as additional challenges which will become apparent from the disclosure set forth below.

SUMMARY

This summary is provided to introduce a selection of concepts in a simplified form that are further described below in the DESCRIPTION OF THE APPLICATION. This summary is not intended to identify key features of the claimed subject matter, nor is it intended to be used as an aid in determining the scope of the claimed subject matter.

In accordance with one aspect of the present application, a method to adjust power management of off-board devices powered by a vehicle is disclosed. The method comprises: entering a plurality of user selected charging levels for each of the off-board devices, each user selected charging level corresponding to one of a plurality of threshold levels of a state of charge (SOC) level of a battery pack of the vehicle; determining a current SOC of a battery pack of the vehicle; adjusting charging levels of individual off-board devices from first user selected charging levels to second user selected charging levels when the current SOC of the battery pack changes from a first threshold value to a second threshold value.

In accordance with one aspect of the present application, a system to provide adjustable power management of off-board devices is disclosed. The system has an electric motor. A battery pack is coupled to the electric motor. A control module is coupled to the electric motor. A memory is coupled to a processor. The memory stores program instructions that when executed by the processor, causes the processor to: enter a plurality of user selected charging levels for each of the off-board devices, each user selected charging level corresponding to one of a plurality of threshold levels of a state of charge level (SOC) of a battery pack of the vehicle; determine a current SOC of a battery pack of the vehicle; and charge individual off-board devices to corresponding user selected charging levels associated with the current SOC of the battery pack.

In accordance with one aspect of the present application, a system to provide adjustable power management of off-board devices is disclosed. The system has an electric motor. A battery pack is coupled to the electric motor. At least one sensor monitors the battery pack. A control module is coupled to the electric motor and the at least one sensor. The control module has a memory is coupled to a processor. The memory stores program instructions that when executed by the processor, causes the processor to: enter a plurality of user selected charging levels for each of the off-board devices, each user selected charging level corresponding to one of a plurality of threshold levels of a state of charge level (SOC) of a battery pack of the vehicle; determine a current SOC of a battery pack of the vehicle measured by the at least one sensor; and charge individual off-board devices to first user selected charging levels corresponding to the current SOC of the battery monitored by the at least one sensor.

BRIEF DESCRIPTION OF DRAWINGS

Embodiments of the disclosure will become more fully understood from the detailed description and the accompanying drawings, wherein.

DESCRIPTION OF THE APPLICATION

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

Figure 1:
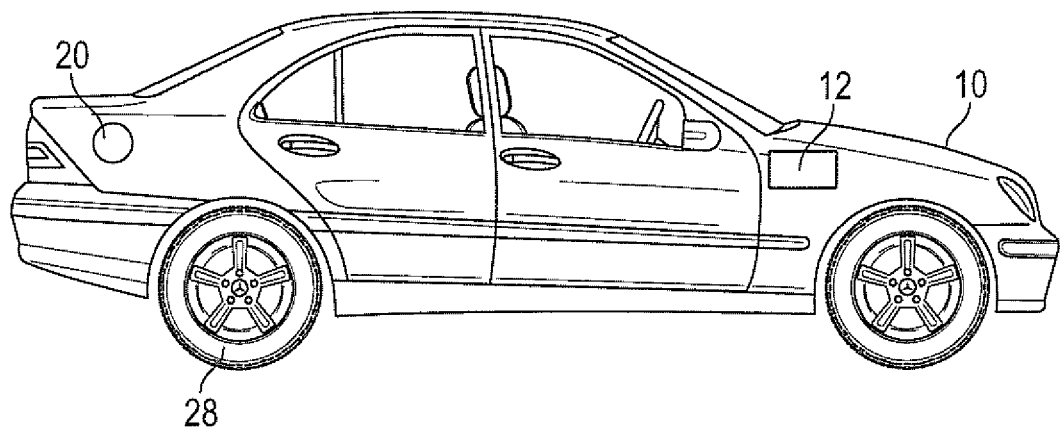
FIG. 1 is an elevated perspective view of a vehicle implementing an exemplary system and method for adjustable power management of off-board devices powered by the vehicle in accordance with one aspect of the present application.

Referring to FIG. 1, an exemplary vehicle 10 is shown. The vehicle 10 may be an electric vehicle (EV) such as a plug-in electric vehicle (PEV), a hybrid electric vehicle (HEV) such as plug-in hybrid electric vehicles (PHEVs), as well as other types of battery electric vehicles (BEVs) which may be propelled either in whole or in part by an electric motor powered by a battery pack. The description below may describe a system 12 in an HEV which may have an internal combustion engine (ICE). However, the system 12 may be used in other types of battery electric vehicles (BEVs) having no ICE.

The vehicle 10 may be equipped with a system 12. The system 12 may be used to control power distribution to on-board and off-board systems of the vehicle 10. The system 12 may allow a user to set one or more charging levels for off-board systems having rechargeable batteries and/or one or more power levels for off-board systems with or without rechargeable batteries that may be coupled to the vehicle 10. By allowing the user to control the charging level and/or power level of the off-board systems, the system 12 may allow one to preserve power stored in the battery pack of the vehicle 10. For example, the system 12 may be configured to charge an off-board device to a user selected value as long as charging of the off-board system will not cause a current state of charge (SOC) of the battery pack of the vehicle 10 to fall below a user selected and/or manufacturer suggested level. If the current SOC falls below the user selected level, the system 12 may adjust the charging level to another user selected value. If the off-board system does not have rechargeable batteries and is just being powered by the system 12, the system 12 may be configured to power the off-board system at a user selected power level until the current SOC falls below a user selected and/or manufacturer suggested level. If the current SOC falls below the user selected level, the system 12 may adjust the power level to another user selected value.

Figure 2:
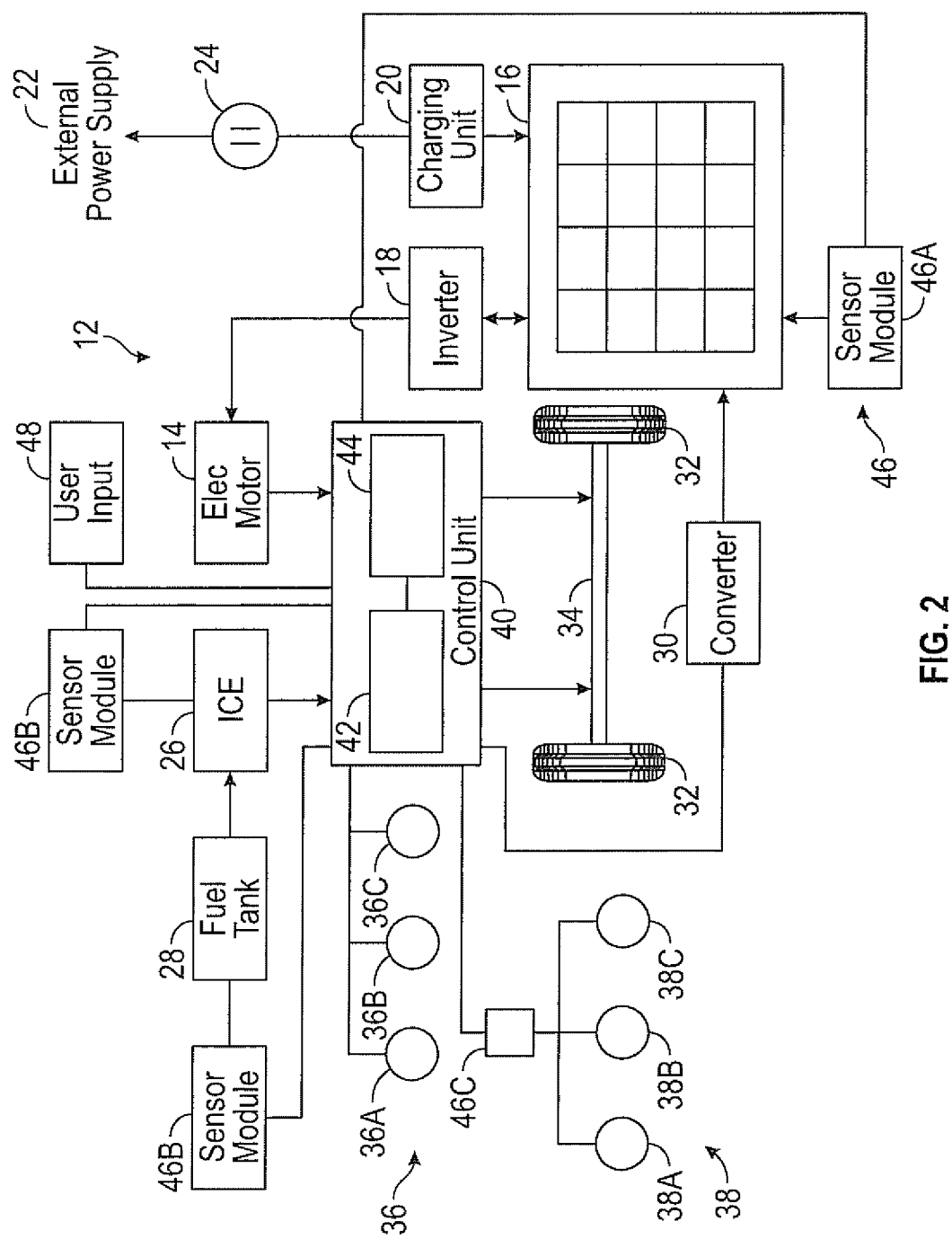
FIG. 2 is a simplified functional block diagram of the system for adjustable power management of off-board devices powered by the vehicle depicted in FIG. 1 in accordance with one aspect of the present application.

Referring now to FIGS. 1 and 2, the system 12 in the vehicle 10 may be seen. The system 12 may have an electric motor 14. The electric motor 14 may be used for propelling the vehicle 10. The electric motor 14 may be used as the main source of propulsion by the vehicle 10. The system 12 may have a battery pack 16. The battery pack 16 may be used to power the electric motor 14. The battery pack 16 may be coupled to the electric motor 14 through an inverter 18. The inverter 18 may be used to convert DC current from the battery pack 16 to an AC current for powering the electric motor 14.

The system 12 may have a charging device 20. The battery pack 16 may be coupled to a charging unit 20. The charging unit 20 may be used to recharge the battery pack 16 when the charging unit 20 is connected to an external power supply 22 such as an electric power grid or the like. The charging unit 20 may be used to convert the AC power from the external power supply 22 to DC power for charging the battery pack 16. A connector 24 may be coupled to the changing device 20. The connector 20 may be used to couple the external power supply 22 to the charging device 20.

An ICE 26 may be used to assist propulsion of the vehicle 10. The ICE 26 may be used in circumstances such as high speed and/or high power demand operations due to system constraints. The ICE 26 may be used to power the vehicle 10 when the battery pack 16 has limited and/or no energy to power the electric motor 14. The ICE 26 may be coupled to a fuel tank 28. The fuel tank 28 may be used to store combustible material for powering the ICE 26.

The ICE 26 may be used to recharge the battery pack 16. When the ICE 26 is running, power from the ICE 26 may be used to recharge the battery pack 16. A converter 30 or similar device may be positioned between the ICE 26 and the battery pack 16. The converter 30 may be used to convert the energy from the ICE 26 to DC power for charging the battery pack 16.

The electric motor 14 and/or the ICE 26 may be used to provide power to rotate drive wheels 32 of the vehicle 10 through a drive train 34. The drive train 34 may be used to deliver power generated by the electric motor 14 and or the ICE 16 to rotate the drive wheels 28.

A control unit 40 may be coupled to the electric motor 14, the ICE 26, the converter 30 and the drive train 34. The control unit 40 may be used to control power distribution to the drive train 34. One or more on-board systems 36 and one or more off-board systems 38 of the vehicle 10 may be coupled to the control unit 40. While three on-board systems 36A-36C and three off-board systems 38A-38C may be shown in FIG. 2, this is shown as an example. The system 12 may have any number of on-board systems 36 and off-board systems 38. The control unit 40 may be may be used to control power distribution to the drive train 34, the on-board systems 39 and the off-board systems 38.

The control unit 40 may have a processor 42. The processor 42 may be implemented in hardware, software or a combination thereof. The processor 42 may store a computer program or other programming instructions associated with a memory 44 to control the operation of the control unit 40. The data structures and code within the software in which the present disclosure may be implemented, may be stored on a non-transitory computer-readable storage. The non-transitory computer-readable storage may be any device or medium that may store code and/or data for use by a computer system. The non-transitory computer-readable storage medium may include, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed. The processor 42 may comprise various computing elements, such as integrated circuits, microcontrollers, microprocessors, programmable logic devices, etc, alone or in combination to perform the operations described herein.

The system 12 may have one or more monitoring sensors 46. At least one sensor 46A may be coupled to the battery pack 16 of the vehicle 10. The monitoring sensor 46A may be used for monitoring a current charge state of charge (SOC) of the battery pack 16, charging status of the battery pack 16, and other operating conditions of the battery pack 16 such as those that may affect battery degradation. Other sensors 46B may be used to monitor the operating statuses and levels of other systems within the vehicle 10. In accordance with one embodiment, the sensors 46B may be used to monitor the operating statuses and levels of systems within the vehicle 10 such as but not limited to, the fuel tank 28, the ICE 26, the electric motor 14, the inverter 18, the charging unit 20, and other systems of the vehicle 12. Sensors 46C may be used to monitor different off-board systems 38. The sensors 46C may be used to monitor if any off-board systems 38 have been coupled to the vehicle 10, charging/power status level of the off-board systems 38, as well as other operating conditions of the off-board systems 38. The monitoring sensors 46A-46C may be coupled to the control unit 40.

A user interface 48 may be coupled to the control unit 40. The user interface 48 may allow a user of the system 12 to enter one or more charging levels and/or power levels for the off-board systems 38 as well as one or more threshold charge limits for the battery pack 16. The user interface 48 may be any type of input device that may allow the user to enter charging levels and/or power levels for the off-board systems 38 as well as one or more threshold charge limits for the battery pack 16. In accordance with one embodiment, the user interface 48 may be touch screen display having graphical user interface (GUI) such as an alphanumeric display. The touch screen display may form part of a telemetric system of the vehicle 10.

As stated above, the user interface 48 may allow a user of the system 12 to enter one or more charging levels and/or power levels for the off-board systems 38 as well as one or more threshold charge limits for the battery pack 16. This may allow one to preserve power stored in the battery pack of the vehicle 10 and prioritize the off-board systems 38. For example, instead of fully charging each off-board systems 38, the user may set the charging level of the off-board system 38A to seventy-five (75) percent of a maximum charge level for the off-board system 38A, the charging level of the off-board system 38B to fifty (50) percent of a maximum charge level for the off-board system 38B, and the charging level of the off-board system 38C to forty (40) percent of a maximum charge level for the off-board system 38C. Thus, instead of fully charging each of the off-board systems 38A-38C, the user may conserve energy stored in the battery pack 16 by partially charging and maintaining the off-board systems 38A-38C to seventy-five (75) percent, fifty (50) percent, and forty (40) percent, respectively.

In another embodiment, the user may set the power level of the off-board systems 38. Thus, instead of supplying a full power load to the off-board systems 38, the user may conserve energy stored in the battery pack 16 by partially powering one or more of the off-board system 38. For example, the user may set the power level of the off-board systems 38A to seventy (70) percent of a maximum power level for the off-board system 38A. If the off-board systems 38A is a lantern, the user may conserve energy stored in the battery pack 16 by partially powering the lantern (off-board system 38A) to seventy (70) percent of a maximum power level of the off-board system 38A. While partially powering the lantern may prevent the lantern from being fully illuminated, the user may be able to use the lantern while conserve energy stored in the battery pack 16.

The control unit 40 may be used to enter charging levels and/or power levels for the off-board systems 38 based on one or more threshold SOC limits for the battery pack 16. For example, the user may configure the system 12 to fully charge or power all of the off-board systems 38 as long as the current SOC of the battery pack 16 remains above eighty (80) percent. However, if the current SOC of the battery pack 16 falls below eighty (80) percent, the control unit 40 may be configured to charge and/or power the off-board systems 38A to seventy (70) percent of maximum, off-board systems 38B to fifty (50) percent of maximum and off-board systems 38C to fifty (50) percent of maximum. If the SOC of battery pack 16 falls below fifty (50) percent, the control unit 40 may be configured to power the off-board system 38A to forty (40) percent while the off-board systems 38B and 38C may not be charged and/or powered. The above is given as an example and other percentages as well as combinations off-board systems 38B may be used.

Figure 3:
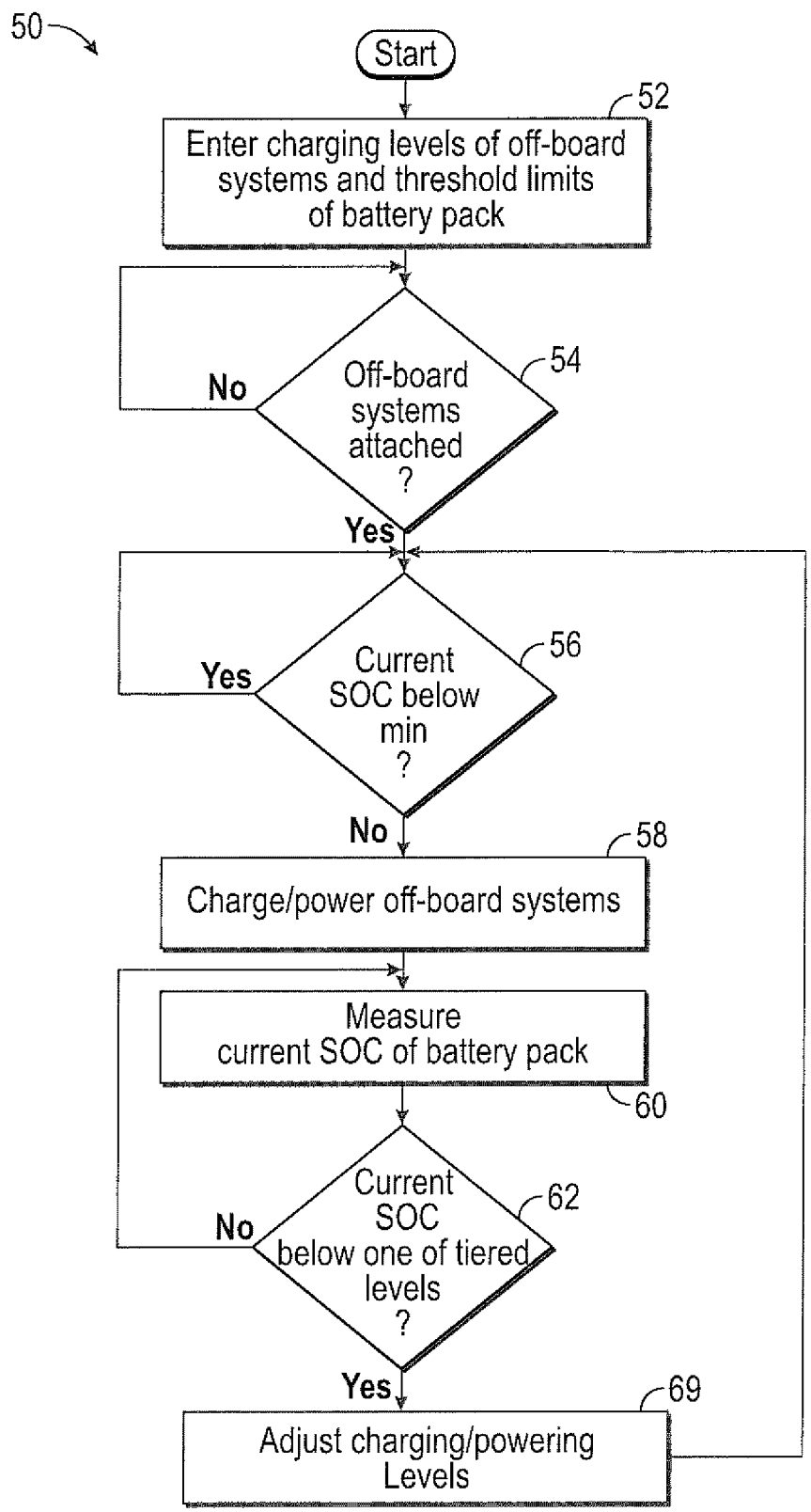
FIG. 3 is an exemplary flowchart depicting an illustrative method of adjustable power management of off-board devices powered by the vehicle in according to one aspect of the present application.

Referring now to FIGS. 1-3, operation of the system 12 may be described. The method 50 may start with entering charging levels and/or power levels for one or more of the off-board systems 38 as well as one or more threshold SOC limits for the battery pack 16 as shown in block 52. These limits may be user selected or alternatively, may be manufacturer suggested levels. The above data may be entered into the system 12 using the user interface 48. Alternatively, some of the data may be preprogrammed into the system 12. For example, manufacturer suggested guidelines may suggest not draining the battery pack 16 below a predetermined level. Based on the manufacturer suggested guidelines, the system 12 may be preprogrammed to prevent charging and/or powering the off-board systems 38 if the SOC of the battery pack 16 falls below the predetermined level.

The system 12 may determine if off-board systems 38 have been coupled to the vehicle 10 as shown in block 54. In accordance with one embodiment, the sensors 46C may be used to monitor if any off-board systems 38 have been attached to the vehicle 12. If no off-board systems 38 have been detected, the system 12 may continue to monitor for any off-board system 38 to be coupled thereto.

If one or more off-board systems 38 have been coupled to the system 12, a determination may be made as to whether the current SOC of the battery pack 16 is above a minimum threshold limit for charging/powering the one or more off-board systems 38 as shown in block 56. If the current SOC of the battery pack 16 is below the minimum threshold limit, the system 12 may not charge and/or power the attached off-board systems 38. The system 12 may continue not to charge and/or power the attached off-board systems 38 until the current SOC of the battery pack 16 rises above the minimum threshold limit.

If the current SOC of the battery pack 16 is above the minimum threshold limit, the system 12 may charge and/or power the attached off-board systems 38 as shown in block 58. The system 12 may charge and/or power the attached off-board systems 38 based on the charging levels and/or power levels entered into the system 12. During charging and/or powering of the off-load systems 38 the system 12 may continue to monitor the current SOC of the battery pack 16 as shown in block 60. A determination may be made as to whether the current SOC of the battery pack 16 during charging and/or powering of the off-load systems 38 has fallen below one of the tiered threshold levels as shown in block 62. If the current SOC of the battery pack 16 has not fallen below one of the tiered threshold levels, the system 12 may continue to charge and/or power the off-board systems 38 based on the current charging levels and/or power levels entered into the system 12. If the current SOC of the battery pack 16 has fallen below one of the tiered threshold levels, the system 12 may adjust the charging and/or power level for the off-board systems 38 based on the current tiered threshold level of the battery pack 16 as shown in block 64. After adjusting the charging levels and/or power levels for the one or more off-board system 38, the system 12 may continue to monitor the current SOC of the battery pack 16 for further changes in the charge level of the battery pack 16.

While embodiments of the disclosure have been described in terms of various specific embodiments, those skilled in the art will recognize that the embodiments of the disclosure may be practiced with modifications within the spirit and scope of the claims.

What is claimed is:

1. A method to adjust power management of off-board devices powered by a vehicle comprising:
    entering a plurality of user selected charging levels for each of the off-board devices, each user selected charging level corresponding to one of a plurality of threshold levels of a state of charge (SOC) level of a battery pack of the vehicle;
    determining a current SOC of a battery pack of the vehicle; and
    adjusting charging levels of individual off-board devices from first user selected charging levels to second user selected charging levels when the current SOC of the battery pack changes from a first threshold value to a second threshold value.

2. The method of claim 1, wherein the first user selected charging levels are less than the second user selected charging levels preventing the current SOC of the battery pack from falling below a minimum threshold value.

3. The method of claim 1, further comprising monitoring the current SOC of the battery pack for changes in the threshold levels.

4. The method of claim 1, further comprising discontinuing charging of the off-board devices when the current SOC of the battery pack falls below a minimum threshold level.

5. The method of claim 1, further comprising charging each of the off-board devices to full charge if the current SOC of the battery pack is above a maximum threshold value.

6. The method of claim 1, wherein the plurality of user selected charging levels for each of the off-board devices and corresponding threshold levels is inputted by a user using a graphical user interface (GUI).

7. The method of claim 1, wherein the GUI forms part of a telematic system of the vehicle.

8. A system to provide adjustable power management of off-board devices comprising:
    an electric motor;
    a battery pack coupled to the electric motor;
    a control module coupled to the electric motor;
    a memory coupled to a processor, the memory storing program instructions that when executed by the processor, causes the processor to:
        enter a plurality of user selected charging levels for each of the off-board devices,
    each user selected charging level corresponding to one of a plurality of threshold levels of a state of charge (SOC) level of a battery pack of the vehicle;
    determine a current SOC of a battery pack of the vehicle; and
    charge individual off-board devices to corresponding user selected charging levels associated with the current SOC of the battery pack.

9. The system of claim 8, wherein the memory storing program instructions that when executed by the processor, causes the processor to monitor the current SOC of the battery pack for changes in the threshold levels.

10. The system of claim 8, wherein the memory storing program instructions that when executed by the processor, causes the processor to adjust the charging level of specified off-board devices from first user selected charging levels to second user selected charging levels when the current SOC of the battery pack changes to a different threshold level.

11. The system of claim 8, wherein the memory storing program instructions that when executed by the processor, causes the processor to discontinue charging of the off-board devices when the current SOC of the battery pack falls below a minimum threshold level.

12. The system of claim 8, wherein the memory storing program instructions that when executed by the processor, causes the processor to charge each of the off-board devices to full charge if the current SOC of the battery pack is above a predetermined threshold value.

13. The system of claim 8, wherein the plurality of user selected charging levels for each of the off-board devices and corresponding threshold levels is inputted by a user using a graphical user interface (GUI).

14. The system of claim 13, wherein the GUI forms part of a telematic system of the vehicle.

15. A system to provide adjustable power management of off-board devices comprising:
    an electric motor;
    a battery pack coupled to the electric motor;
    at least one sensor monitoring the battery pack;
    a control module coupled to the electric motor and the at least one sensor, the control module comprising:
        a memory coupled to a processor, the memory storing program instructions that when executed by the processor, causes the processor to:
            enter a plurality of user selected charging levels for each of the off-board devices, each user selected charging level corresponding to one of a plurality of threshold levels of a state of charge (SOC) level of a battery pack of the vehicle;
            determine a current SOC of a battery pack of the vehicle measured by the at least one sensor; and
            charge individual off-board devices to first user selected charging levels corresponding to the current SOC of the battery monitored by the at least one sensor.

16. The system of claim 15, wherein the memory storing program instructions that when executed by the processor, causes the processor to monitor the current SOC of the battery pack for changes in the threshold levels measured by the at least one sensor.

17. The system of claim 15, wherein the memory storing program instructions that when executed by the processor, causes the processor to adjust the charging level of specified off-board devices to second specified user charging levels corresponding to the current SOC of the battery pack measured by the at least one sensor when the current SOC of the battery pack changes to a different threshold level.

18. The system of claim 15, wherein the memory storing program instructions that when
    executed by the processor, causes the processor to discontinue charging of the off-board devices when the current SOC of the battery pack falls below a minimum threshold level.

19. The system of claim 15, wherein the memory storing program instructions that when executed by the processor, causes the processor to charge each of the off-board devices to full charge if the current SOC of the battery pack is above a predetermined threshold value.

20. The system of claim 15, wherein the plurality of charging levels for each of the off-board devices and corresponding threshold levels is inputted using a graphical user interface (GUI).

* * * * *